(12) United States Patent
Kallio

(10) Patent No.: US 7,567,538 B2
(45) Date of Patent: Jul. 28, 2009

(54) ARRANGING MOBILE-TO-MOBILE CONNECTIONS IN WIRELESS TELECOMMUNICATIONS SYSTEM

(75) Inventor: Janne Kallio, Patti Joki (FI)

(73) Assignee: Nokia Corporation, Espoo (FI)

( * ) Notice: Subject to any disclaimer, the term of this patent is extended or adjusted under 35 U.S.C. 154(b) by 1187 days.

(21) Appl. No.: 10/393,344

(22) Filed: Mar. 21, 2003

(65) Prior Publication Data
US 2003/0220102 A1    Nov. 27, 2003

Related U.S. Application Data

(63) Continuation of application No. PCT/FI01/00821, filed on Sep. 20, 2001.

(30) Foreign Application Priority Data
Sep. 22, 2000    (FI) ................................ 20002094

(51) Int. Cl.
*H04W 4/00* (2006.01)
(52) U.S. Cl. ....................... 370/338; 370/466
(58) Field of Classification Search .................. None
See application file for complete search history.

(56) References Cited

U.S. PATENT DOCUMENTS 5,608,779 A * 3/1997 Lev et al. .................... 455/436
5,649,000 A * 7/1997 Lee et al. .................... 455/436
5,987,327 A * 11/1999 Lev et al. .................... 455/445
6,594,258 B1 * 7/2003 Larson et al. ................ 370/353
6,650,868 B1 * 11/2003 Karabinis .................. 455/12.1

FOREIGN PATENT DOCUMENTS

| EP | 0 766 490 A2 | 4/1997 |
| WO | WO 96/16521 | 5/1996 |
| WO | WO 99/45733 | 9/1999 |
| WO | WO 00/48417 | 8/2000 |

OTHER PUBLICATIONS

The GSM System for Mobile Communications by M. Mouly, M-B Pautet, France 1992, ISBN 2-9507190-07.

* cited by examiner

*Primary Examiner*—Kevin C Harper
*Assistant Examiner*—Rhonda Murphy
(74) *Attorney, Agent, or Firm*—Squire, Sanders & Dempsey, LLP

(57) ABSTRACT

Mobile-to-mobile connections are being arranged in a wireless telecommunications system comprising at least one mobile station, base stations serving the mobile stations, and at least one gateway. The gateway controls the base stations connected to the gateway and performs a protocol conversion. For mobile-to-mobile connections, a second handover algorithm is stored in the gateway. The data transmitted between two mobile stations served by base stations connected to the same gateway is switched in the gateway without a protocol conversion. If a mobile station is engaged in a data transfer connection with another mobile station visiting the wireless telecommunications system, the mobile station is handed over, when necessary, to a base station proposed by a second handover algorithm.

10 Claims, 3 Drawing Sheets

ARRANGING MOBILE-TO-MOBILE CONNECTIONS IN WIRELESS TELECOMMUNICATIONS SYSTEM

This application is a Continuation of International Application PCT/FI01/00821 filed on Sep. 20, 2001, which designated the U.S. and was published under PCT Article 21(2) in English.

BACKGROUND OF THE INVENTION

The invention relates to the arranging of mobile-to-mobile connections in a wireless telecommunications system, more particularly to the arranging of mobile-to-mobile connections in wireless telecommunications systems comprising radio access gateways.

Office information systems are conventionally implemented by providing separate networks for telephone networks and for telecommunications networks comprising computers and their peripherals, i.e. typical local area networks. The development of data and telephone networks and their convergence, on one hand, and the costs arising from the building and maintenance of two parallel networks, on the other, have led to the development of systems that allow local area networks to be used for providing services provided by telephone networks. This trend is essentially due to the improved applicability of IP technology, which has traditionally been employed in data networks, to the transmitting of telephone services.

Modern office telecommunications systems allow also mobile communications systems to be connected to operate through a local area network. In such cases the Local Area Network (LAN), which typically employs IP technology, is used for connecting speech connections based on a mobile communications system protocol to Mobile Stations (MS) via an office-specific Base Station (BS), for example. This means that the conventional Private Branch Exchange (PBX) of the office can be bypassed, and that broadband connections and excellent quality of speech can be provided with wireless data transmission also on short distances. Through the office-specific base station and the local area network the mobile stations provide a wireless connection both to other mobile stations of the office and, through a Mobile Switching Centre (MSC), to external terminals, such as mobile stations outside the office system or to terminals of the wired telephone network (Public Switched Telephone Network, PSTN).

A wireless access network is typically connected to operate through the IP network by using radio access gateways (RAGW) which transmit data between a circuit-switched wireless access network and a packet-switched IP-based network. Radio access gateway is a general term for a device carrying out the protocol conversion of the data to be transferred between the protocol used in the wireless network and that used in the IP network. It should be noted that hereinafter the term 'data transfer' may include the transfer of one or more types of media (audio, video, data).

In prior art wireless telecommunications systems comprising radio access gateways, an IP layer is always allocated to the connection used by a mobile station, even if the connection's source address in the radio access gateway were the same as its destination address. The addresses are the same when a mobile-to-mobile connection is concerned and both the mobile stations are served by base stations connected to the same radio access gateway. To maintain two IP protocol stacks for such connections is unnecessary, and it causes processing capacity to be wasted. The conversion of the data flow of the wireless access network to the transmission format required by the IP network and back to the transmission format of the wireless network delays the data transfer, which is particularly harmful to time-critical applications and loads the network unnecessarily.

BRIEF DESCRIPTIONS OF THE INVENTION

It is an object of the invention to provide a method and an equipment implementing the method that allow the above problems to be avoided. The objects of the invention are achieved with methods, wireless telecommunications systems and radio access gateways characterized by what is stated in the independent claims. The preferred embodiments of the invention are disclosed in the dependent claims.

According to a first aspect of the invention, data to be transferred in mobile-to-mobile communications is switched without a protocol conversion, if the base stations serving the mobile stations are connected to the same radio access gateway. The system involves checking whether the mobile station is engaged in a data transfer connection with another mobile station visiting the wireless telecommunications system. If it is, the routine checks whether the base stations currently serving the mobile stations are connected to the same radio access gateway. If they do, the data between the mobile stations is switched in the radio access gateway without a protocol conversion.

According to a second aspect of the invention, the aim is to carry out at least one handover so that after handover, the mobile stations are still served by base stations connected to the same radio access gateway, or that they will be served by base stations connected to the same radio access gateway. For this purpose, a second handover algorithm is stored into the radio access gateways. The term handover algorithm refers to the operations, calculations and comparisons, and the respective handover criteria, defined by the operator and allowing a decision to be made about when to change the base station and which base station to adopt, if a change is made. When necessary, the mobile station is handed over to the base station proposed by the second handover algorithm, if the mobile station is engaged in a data transfer connection with another mobile station visiting the wireless telecommunications system.

The solution according to the aspects of the invention allows problems caused by protocol conversion to be avoided: since two protocol stacks are no longer required, delays become considerably shorter and less processing capacity is needed. The usage of the second handover algorithm in mobile-to-mobile calls further helps to achieve this advantage. The method of the invention does not require any changes to mobile stations or base stations either.

According to a preferred embodiment of the invention, the proposed base stations that meet the criteria required by the second handover algorithm, such as the signal level criterion, are arranged in an order where base stations connected to the same radio access gateway come first. If the base stations serving the mobile stations are connected to a separate radio access gateway, then the base stations are arranged into an order where the base stations that are connected to a separate radio access gateway come first. This provides an advantage in that the criteria can be checked similarly as in the first handover algorithm, with the aim of bringing the mobile stations within one and the same radio access gateway by arranging the target cells differently than before.

BRIEF DESCRIPTION OF THE DRAWINGS

In the following the invention will be described in greater detail in connection with preferred embodiments and with reference to the accompanying drawings, in which.

DETAILED DESCRIPTION OF THE INVENTION

The invention can be applied in any wireless telecommunications system comprising one or more radio access gateways controlling base stations and providing protocol conversion for transferred data. The invention is particularly suitable for use in an office environment.

Figure 1:
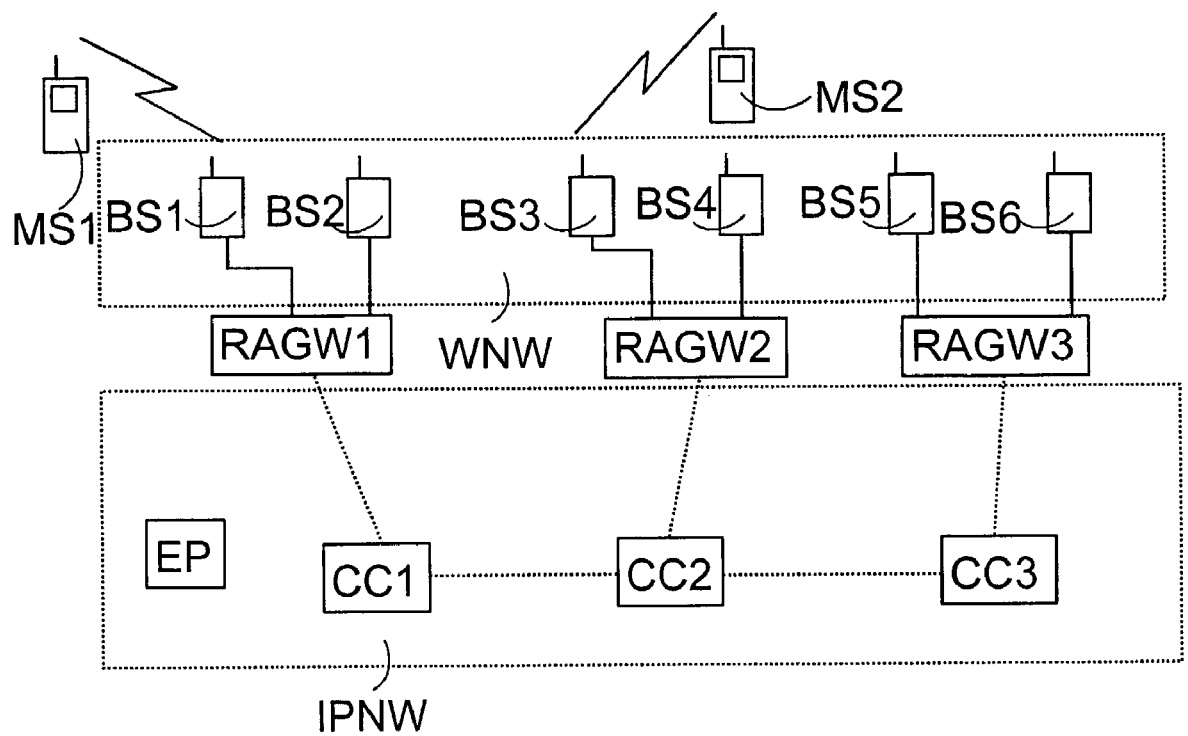
FIG. 1 illustrates a wireless telecommunications system comprising radio access gateways.

FIG. 1 is a schematic view of a wireless telecommunications system, illustrating only elements that are essential in the invention. A mobile station MS1, MS2 supports the GSM system, for example. A base station BS1-6 serves as a transceiver communicating over a radio interface with a plural number of mobile stations MS1-2 located within its coverage area, i.e. cell. The base station BS1-6 is always connected to a radio access gateway RAGW1-3, which controls the radio resources of the base station. Data transfer between the base station BS1-6 and the radio access gateway is circuit-switched transfer based on standards such as E1, T1 or xDSL (Digital Subscriber Line, e.g. HDSL, VDSL, ADSL). The MS registers to the radio access gateway RAGW1-3 through the base station BS1-6 serving it, and either the mobile station or the radio access gateway may take the initiative for a data transfer channel to be allocated to the mobile station. The radio access gateway RAGW1-3 is responsible for transferring the data of mobile stations MS1-2 served by base stations connected to the gateway between an end point EP in an IP network IPNW and other mobile stations MS1-2. The data to be transferred may comprise for example Voice over IP (VoIP), although it is not restricted thereto.

Call control entities CC1, CC2, CC3 control the operation of the radio access gateways RAGW1-3 and typically take care of all signalling (shown with a dotted line in FIG. 1) related to logical connections. The call control entities CC1-3 have a particularly important role in connection setup because they are responsible for transmitting connection setup requests to and from the radio access gateways (broadcast type paging messages). The call control entities CC1-3 may also handle Address Translation, Admission Control and Bandwith Management, maintenance of mobile station-specific data, such as location data, and charging. In FIG. 1 there is a call control entity CC1-3 for each radio access gateway, although a single call control entity may control a plural number of radio access gateways as well. The call control entities CC1-3 are not always necessary either, i.e. the radio access gateways RAGW1-3 may take care of the functions of the call control entities. It is also possible that the system comprises separate elements for controlling one or more radio access gateways and for handling the signalling related to the establishment of a logical connection involving devices (EP, RAGW1-3) connected to the IP network IPNW.

The RAGW1-3 is responsible for handovers taking place between the base stations BS1-6. In this application the term 'handover' means the handing over of a radio traffic channel and the related responsibility from a source system to a target system so that the data transfer connection for the user's service is maintained. Handover may take place because the mobile station moves, or for other reasons, such as to balance the load between cells. The RAGW1-3 comprises a first handover algorithm, already known per se, and receives measurement reports transmitted by the base stations BS1-6 and the mobile stations MS served by the base stations BS1-6. As for example in the GSM system, the first handover algorithm is typically not standardized in detail, in other words, is may be operator- or equipment manufacturer-specific. The measurement reports comprise information about the quality of the connection, signal level and cell identifier data of a plural number of base stations BS1-6, thus allowing the base stations to be distinguished from one another. In the GSM system, for example, a mobile station may measure 32 channels, although the six best base stations may be included in its measurement report.

Upon receiving the measurement report, the radio access gateway RAGW1-3 evaluates the connection provided by the base station currently serving the mobile station. If the connection between the base station and the mobile station is not good enough, the RAGW1-3 applies the first handover algorithm to calculate the preferred target cells for the mobile station. The target cells are calculated according to predetermined criteria, the most important ones of which are the following:

static data: maximum data transmission power of the serving base station, the mobile station and adjacent base stations;

measurements carried out by the mobile station: downlink quality (bit error ratio), reception level on the channel currently in use and from adjacent cells;

measurements carried out by the base station: uplink quality (bit error ratio), reception level on the channel currently in use and from adjacent cells;

cell capacity and load, allocation of radio interface resources.

In addition, the ratio of quality to reception level provides a criterion for interference. The measurement results are compared with predetermined threshold values. If there are several base stations that meet the criteria of the first handover algorithm, i.e. they exceed the required threshold values relating to radio measurements, the base stations are arranged into an order of preference on the basis of the first handover algorithm, typically in accordance with signal reception level and signal quality. The RAGW1-3 initiates handover to the base station BS1-6 that is first in the list.

Handovers may be carried out not only on the basis of radio measurements but also by the initiative of network management either to balance the load, i.e. as Traffic reason handovers, or for reasons of management, i.e. as Management handovers when a base station is to be removed, for example.

It should be noted that the call control entity CC1-3 may typically influence handover and prevent it, for example, by the command of Operation and Maintenance (O&M). The call control entity CC1-3 may also influence the base stations to be measured and/or select another base station than the one proposed by the radio access gateway as the first base station.

In the following a preferred embodiment of the invention will be described with reference to FIG. 2. The base stations BS1-6 connected to the radio access gateways RAGW1-3 of the same telecommunications system are arranged 201 so that their coverage areas overlap at least to some extent. Into the radio access gateways RAGW1-3 is typically stored 201, preferably from the call control entity CC1-3, what is known as an adjacent cell list for each base station connected to the radio access gateway, the list comprising information about base stations adjacent to the base station concerned (their coverage areas being partially overlapping, or at least close to each other). In this case also information relating to adjacent base stations connected to separate radio access gateways may be stored into the adjacent cell lists. The RAGW1-3 may send the adjacent cell list to the mobile station, which then measures the base stations in the adjacent cell list to which handover is allowed. If the invention is applied in an office environment, the base station coverage areas connected to the radio access gateway RAGW1-3 overlap so that a single radio access gateway is not responsible for a single floor, but a floor comprises base stations BS1-6 connected to different radio access gateways RAGW1-3. This allows various radio access gateways to be made available in one floor. For example, in the telecommunications system shown in FIG. 1, base station BS2, which is connected to radio access gateway RAGW1, and base station BS3, which is connected to radio access gateway RAGW2, are arranged into one and the same floor.

Into the memory of the radio access gateways RAGW1-3 is stored 202 a second handover algorithm for mobile-to-mobile connections. The second handover algorithm aims at selecting the base stations, or target cells, to be proposed so that the base stations serving mobile stations communicating with each other would be connected to the same radio access gateway. The second handover algorithm may make use of the same criteria as the first handover algorithm, although different emphasis can be applied to give preference either to base stations connected to the same radio access gateway or to those connected to separate radio access gateways.

In the radio access gateway RAGW1-3 of a preferred embodiment of the invention is checked 204 whether the mobile station MS1-2 it serves is engaged in a connection between mobile stations located in the same system, i.e. a Mobile-to-Mobile Connection (MMC). This is checked preferably already at the connection setup 203, or immediately thereafter.

If the mobile station is not engaged in a connection with another mobile station in the same system, handovers may be carried out 205 according to the first handover algorithm. If the mobile stations communicating with each other are located in the same system, the routine checks 206 whether the mobile stations are being served by base stations connected to the same radio access gateway.

The checks 204, 206 may be carried out by checking the IP address to which data is to be transmitted from the mobile station MS1-2. Preferably, if the IP address indicates that the data is to be transmitted to a radio access gateway located in the same system, the RAGW1-3 detects that the mobile stations communicating with each other are in the same system. Since the second handover algorithm is worth using only if there are base stations that are connected to the same radio access gateway adjacent to the mobile stations, the radio access gateway preferably comprises the IP addresses of radio access gateways of the same system that are connected to base stations adjacent to the base stations connected to the radio access gateway concerned. In practice this is achieved for example by arranging radio access gateways serving one and the same office, on the basis of the same sub-network address, for example, into one and the same system. On the basis of the IP addresses of the connections, the radio access gateway thus knows when to apply the second handover algorithm. When data is to be transmitted from the mobile station to a stored address, the radio access gateway adopts the second handover algorithm, instead of the first handover algorithm, preferably immediately after the connection setup.

The check 206 may be carried out by comparing the IP address of the radio access gateway, i.e. the source address of the data transmitted from the radio access gateway, to the destination address of the recipient. If the destination address and the source address are the same, the base stations serving the mobile stations are connected to the same radio access gateway. An advantage of this solution is that it is easy to implement.

If the mobile stations are served by base stations connected to the same radio access gateway, the data to be transmitted in the radio access gateway may be switched 207 without protocol conversion directly from one base station to another. If the check 206 shows that the base stations are connected to the same radio access network, bi-directional data flows are switched already in the time-division domain. For example, speech frames may be connected substantially directly from uplink to downlink. Transfer from uplink to downlink typically requires that the various data control bits are changed, but this takes up considerably less processing capacity than the adding and removing of IP stacks. If a speech connection is concerned and the mobile stations employ different codecs, direct switching 207 of data is prevented, or one of the mobile stations is ordered to change its codec.

By arranging the radio access gateway RAGW1-3 to transfer data relating to a mobile-to-mobile connection without making a protocol conversion between the IP network IPNW and the wireless network WNW, problems related to the protocol conversion are avoided: significantly shorter delays are achieved and less processing capacity is required because two IP stacks are not needed. In time-critical applications in particular, such as speech and video connections, reduced delays improve the quality of service. In addition, the load on the IP network IPNW is reduced and some of the connections need not be ciphered, because data is not sent to the IP network IPNW.

When the connection in question is a mobile-to-mobile connection involving mobile stations of the same system, the second handover algorithm is executed 208, the algorithm defining the base stations to be proposed on the basis of the measurement reports it receives. The measurement reports in turn are drawn up on the basis of the measurements of/by the base stations included in the adjacent cell list sent by the radio access gateway RAGW1-3. If necessary, the mobile station is handed over 208 to the base station proposed by the second algorithm. The routine checks again 209, preferably at least after handover, whether the base stations currently serving the mobile stations belong to the same radio access gateway.

In the following, the execution (208) of the second handover algorithm will be described in greater detail, by way of example, in a situation where it is detected that handover from the base station BS1 currently serving the mobile station MS1 is needed. The MS1 communicates with the mobile station MS2 and, on the basis of the check (206), the base stations serving the mobile stations MS1, MS2 are connected to a) the same radio access gateway or b) separate radio access gateways.

a) If the base stations (BS1 and BS2, for example) serving the mobile stations MS1, MS2 are connected to the same radio access gateway RAGW1, base stations connected to the same radio access gateway will be preferred, in accordance with the second handover algorithm. To the extent possible, handovers of the mobile station MS1 only involve the base stations BS1, BS2. Handover is thus carried out to the base station (BS2) connected to the same radio access gateway RAGW1, if the following conditions are met:

the mobile station MS1 measures a signal received from at least one base station (BS2) connected to the same radio access gateway;

the at least one measured base station (BS2) connected to the same radio access gateway is adjacent to the base station (BS1) serving the mobile station MS1;

the signal level and/or quality provided by the at least one base station (BS2) connected to the same radio access gateway and measured by the mobile station MS1 exceeds a predetermined threshold value.

The above described conditions may be considered as minimum requirements given by way of example. It is to be noted that handover is not triggered only when signal-level requirements are met, but other criteria suitable for this purpose, and combinations thereof, may also be used.

The second handover algorithm may apply exactly the same criteria and threshold values as the prior art first handover algorithm. According to a preferred embodiment of the invention, if several base stations (BS2, BS3, BS4, for example) are available that meet the above conditions, the second handover algorithm arranges the base stations exceeding a sufficient signal (and/or quality) level into an order, the base stations (BS1-2) connected to the same radio access gateway RAGW1 being, however, placed first. Moreover, among the base stations connected to the same radio access gateway RAGW1, the one that has the best signal level is the one to be proposed, i.e. it is placed first in the list of target cells. The second handover algorithm may thus follow basically the principles of the first handover algorithm, added with a new method for arranging the target cells.

The RAGW1 initiates handover to the base station (BS2) proposed by the second handover algorithm, i.e. the one that is first in the list. If handover can be accomplished, the RAGW1 may reserve the necessary resources and command the mobile station MS1 to handover to the base station BS2 belonging to the RAGW1 (intra-RAGW handover). The MS1 sets up a connection to the base station BS2 in accordance with the command, after which the connection established through the base station BS1 can be released.

b) If the base stations (e.g. BS1 and BS2) serving the mobile stations MS1, MS2 are connected to separate radio access gateways, base stations connected to separate radio access gateways are preferred, in accordance with the second handover algorithm. To the extent possible, only handovers to base stations (BS3-6) connected to separate radio access gateways (RAGW2-3) are carried out. Handover to a base station connected to a separate radio access gateway is carried out provided that the following conditions are met:

the mobile station MS1 measures a signal received from at least one base station (such as BS3, BS4) connected to a separate radio access gateway;

the measured at least one base station (BS3, BS3) connected to a separate radio access gateway is adjacent to the base station (BS1) serving the mobile station;

the signal level and/or quality of the at least one base station (BS3, BS4) connected to a separate radio access gateway measured by the mobile station exceeds a predetermined threshold value.

The comparisons may indicate that several base stations (e.g. BS2, BS3, BS4) that meet the above conditions are available. In that case the second handover algorithm arranges the base stations exceeding the required signal level into an order in which the base stations (BS3, BS4) connected to a separate radio access gateway (RAGW2) are preferably first.

The RAGW1 initiates handover to the base station (BS2) placed first in the list of base stations proposed by the second handover algorithm. If handover can be accomplished, the RAGW1 (or the CC1 controlling it) may inform a new radio access gateway (RAGW2) that handover is needed, the RAGW2 comprising information about the target base station (BS3 or BS4). This allows the RAGW2 to reserve the resources, after which a handover command can be sent to the mobile station MS1.

When checking the alternatives a) and b), the radio access gateway RAGW1 must know at least whether the checked base station is connected to it or to a separate radio access gateway. This can be checked by comparing the cell identifiers (cell id) included in the measurement reports with those of the base stations connected to the RAGW1. This provides an advantage in that no new fields need to be added to the measurement reports.

According to a preferred embodiment of the invention, the criteria of the second handover algorithm differ from those of the first handover algorithm. Base stations connected to the same radio access gateway may be preferred by applying lower threshold values. For example, the threshold value for signal level applied to base stations connected to the same radio access gateway may be lower than that applied to base stations connected to separate radio access gateways. Consequently, radio access gateways RAGW1-3 are provided with one or more new threshold values for mobile-to-mobile connections. However, when necessary, handover is naturally carried out, for example if signal level is too low, even if the mobile stations MS1, MS2 are served after the handover by base stations connected to separate radio access gateways.

When the base stations serving the mobile stations are connected to separate radio access gateways (RAGW1, RAGW2), the threshold value for signal level and/or quality determined by the second handover algorithm may be lower for the base stations (BS3, BS4) connected to separate radio access gateways (RAGW2) than for the base stations (BS1, BS2) connected to the same radio access gateway (RAGW1). In such cases the RAGW1 making a handover decision may prefer base stations (BS3-6) belonging to separate radio access gateways and indicated by the measurements, whereby the mobile stations (MS1, MS2) may be brought within one and the same radio access gateway (RAGW2) (since the RAGW1 is not necessarily aware of the radio access gateway to which the base station serving the mobile station MS2 is connected).

It is also possible to further develop the second algorithm and to aim at making one or more handovers so as to consciously connect the mobile stations MS1, MS2 to base stations connected to the same radio access gateway. To be able to find out the radio access gateway a base station to be measured is connected to, an identifier identifying the radio access gateway, or preferably an IP address, is used. The address of the radio access gateway to which the base station is connected may be added to the radio access gateway RAGW1-3, for example in the adjacent cell list comprising the usual cell identifiers. Consequently, when base stations BS1-6 included in the adjacent cell lists are being measured, the radio access gateway RAGW1-3 knows the radio access gateway of each base station. For example, on the basis of the IP address to which data is to be transmitted, the radio access gateway RAGW1 serving the mobile station MS1 knows the radio access gateway (e.g. RAGW2) of the second mobile station MS2. The radio access gateway RAGW1 can thus compare the radio access gateway addresses of the measured base stations with the radio access gateway address of the MS2 and give preference to the base stations (BS3, BS4) connected to the RAGW2. Base stations can be given preference by either arranging them into an order or by applying lower threshold values, as described earlier.

It is also possible that the radio access gateways RAGW1-3 exchange connection-specific signalling messages at predetermined intervals to inform one another about the radio access gateways the base stations serving the mobile stations are connected to.

If after the handover completed in situation b) the base stations serving the mobile stations are still not connected to the same radio access gateway, the second handover algorithm may be applied to attempt handover to a base station connected to a third separate radio access gateway. However, this solution is not necessarily always applicable due to the mobility of the mobile stations. Unlike in the examples described above, the call control entity CC1-3 may have a more active role when the functionality of the invention is implemented, i.e. they may for example carry out the checks 204 and 206 and issue commands on the basis of the checks to the radio access gateway RAGW1-3 (205, 207, 208).

Figure 3:
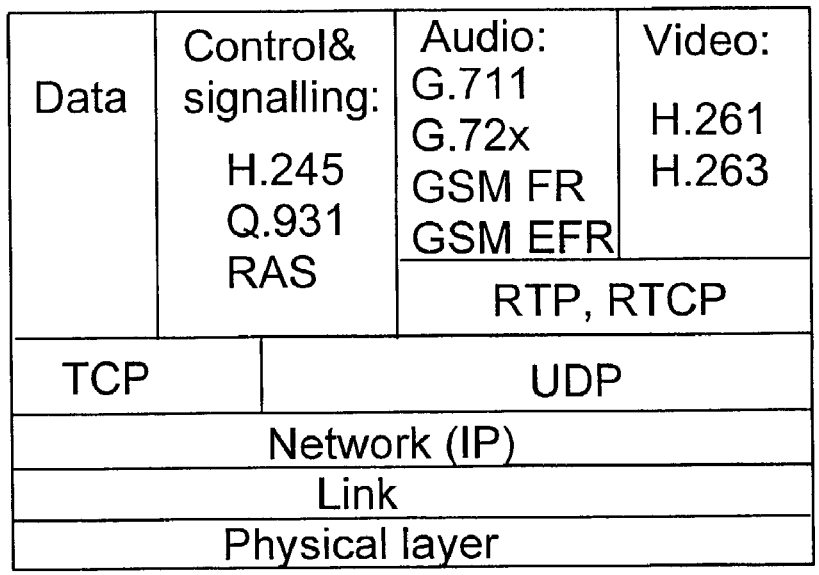
FIG. 3 illustrates a protocol stack conforming to the H.323 standard.

In a telecommunications system according to a preferred embodiment of the invention, IP-based packet-switched data may be transferred using the H.323 protocol, reference being made here to FIG. 3, which shows different H.323 protocol layers. The H.323 protocol is one of the ITU (International Telecommunications Union) protocols and it is widely used for transferring information containing speech and video in packet-switched networks, such as the Internet. H.323 functionality can be implemented in the radio access gateway RAGW1-3. The H.323 standard comprises a plural number of protocols. Depending on the application, a reliable or non-reliable transfer protocol, TCP (Transmission Control Protocol) or UDP (User Datagram Protocol) is used on top of the IP layer. An RTP/RTCP (Real-time Transport Control Protocol) uses a UDP protocol to form packets of audio/video flows and to synchronize them over the packet-switched network. The audio codecs used may be for example the G.711 and G71x codecs of the ITU, and the FR (Full Rate) and EFR (Enhanced FR) codecs used in the GSM system. At least codecs conforming to the H.261 and H.263 standards may be used as video codecs. The H.323 standard also supports the transfer of pure data in accordance with the D.120 standard. The H.225 protocol is responsible for signalling related to connection setup in particular and it is based on Q.931 signalling. The H.245 determines Conference Control and Capability Exchange messages. The H.225 protocol determines for example RAS messages (Registration, Admissions and Status), used for example for finding and registering gatekeepers, and Q.931 messages, used mainly for setting up a connection between end points.

Another standard used for transferring voice over IP is the SIP (Session Initiation Protocol) developed by the IETF (Internet Engineering Task Force), which is an application-level control protocol and which may be supported by the radio access gateway RAGW1-3. The radio access gateway RAGW1-3 may also support the SIP or H.248/Megaco protocols.

Figure 4:
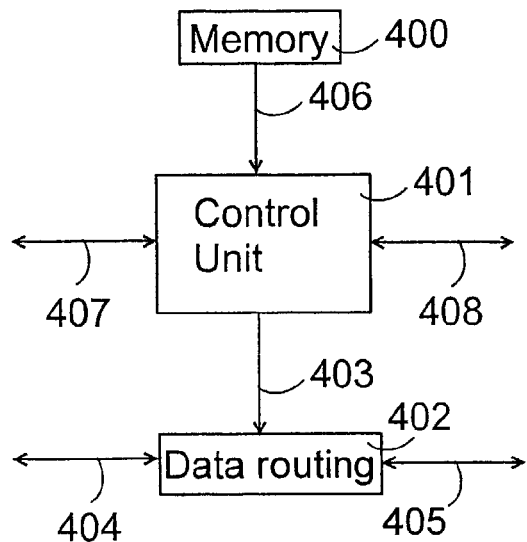
FIG. 4 illustrates a radio access gateway and its interfaces.

FIG. 4 shows a more detailed view of the radio access gateway RAGW1-3 of a preferred embodiment of the invention, together with its interfaces, incorporating only the elements that are essential in the invention. The RAGW1-3 comprises memory 400 for example for storing the first and the second handover algorithms and the adjacent cell list, a Control Unit 401 particularly for executing the second handover algorithm, and Data Routing means 402. On the basis of commands 403 received from 401, 402 carries out the protocol conversion of circuit-switched data of the mobile communications network WNW to provide packet-switched data 405 of the IP network IPNW, and vice versa; alternatively, it may switch data directly from one base station to another in circuit-switched format. 401 may carry out the checks (204, 206) described in FIG. 2, command (207) the switching means 402 to switch data without protocol conversion, and to initiate handover to a base station proposed by the executed second handover algorithm. For this purpose, 401 uses the second handover algorithm obtained 406 from the memory 400, the measurement results 407 transmitted by the base stations BS1-6 connected to the radio access gateway, and possibly instructions 408 obtained from the call control entity CC1-3. Consequently, the radio access gateway RAGW1-3 may be divided into a media controller (401) and a media gateway (402).

The elements essential to the invention, such as the control means 401, are implemented preferably by means of software executed in a processor. It is also possible to employ hardware solutions, such as an ASIC (Application Specific Integrated Circuit), or separate logic.

Figure 5:
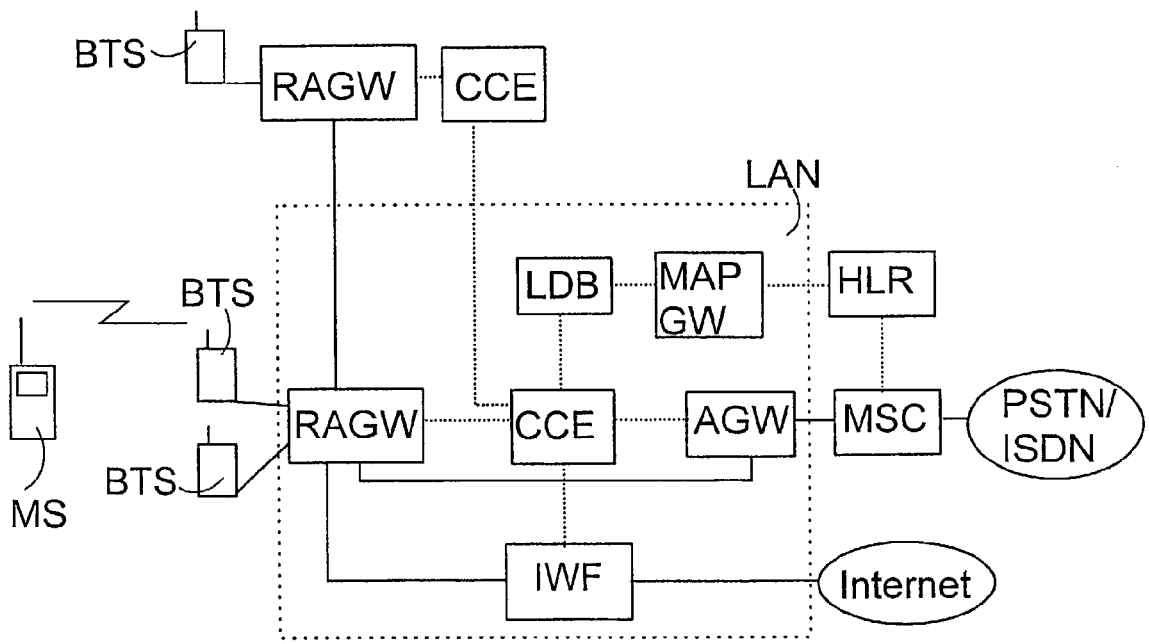
FIG. 5 illustrates a wireless telecommunications system based on the GSM system in greater detail.

FIG. 5 illustrates a wireless telecommunications system in greater detail, the system being particularly well suited for providing wireless data connections in an office environment. The system shown in FIG. 5 is based on the GSM system to which an IP-based location area network LAN is added. The mobile station MS supports the GSM standard and comprises a SIM (Subscriber Identity Module). The MS communicates with a Base Transceiver Station (BTS) supporting the GSM standard. The base stations BTS may be identified on the basis of Base Station Identity Codes (BSIC), Network Colour Codes (NCC) and on the basis of the frequencies used by the base stations.

The BTS is connected to the radio access gateway RAGW which carries out for example the functions of the H.323 gateway. The RAGW controls one or more base stations BTS and thereby the radio network and its resources. The RAGW carries out the necessary data conversions (also to signalling data as well) between the base station BTS (Abis interface) and the IP-based LAN network LAN. From the point of view of the base station BTS, the RAGW is a Base Station Controller (BSC) of the GSM system.

The call control entity CCE is responsible for Call Control and Mobility Management of visiting mobile stations MS within the area of the radio access gateways RAGW in the area of the CCE. The CCE performs address translation and compiles call data records. The CCE also provides an interface for network operation and maintenance carried out by an O&M server (not shown in FIG. 5). The CCE may also grant rights for allocating data transfer resources to the mobile station MS by using a Location Database (LDB). The LDB is provides different directory services, such as maintenance of terminal-and subscriber-specific information and transmission of the information to the CCE, when necessary. In addition, location data of the mobile station MS obtained from the location updates is maintained in the LDB and billing data from the CCE is collected there. The LDB typically communicates also with the Home Location Register (HLR) of the GSM network through a MAP (Mobile Application Part) protocol gateway MAPGW.

The call control entity CCE has a connection to an A-interface Gateway AGW which transmits data between the LAN network and a mobile switching centre MSC of the GSM network. This allows a data transfer or signalling connection to be established between the LAN and the GSM network, and a further connection to be set up to PSTN/ISDN networks and to terminals connected to the networks. IP-based transfer and receipt of data to external IP-based networks, such as the Internet, may also be carried out from the GW through an Interworking Function (IWF). The IWF performs the necessary lower layer protocol conversions in the data transfer between the LAN network LAN and the external networks.

Figure 2:
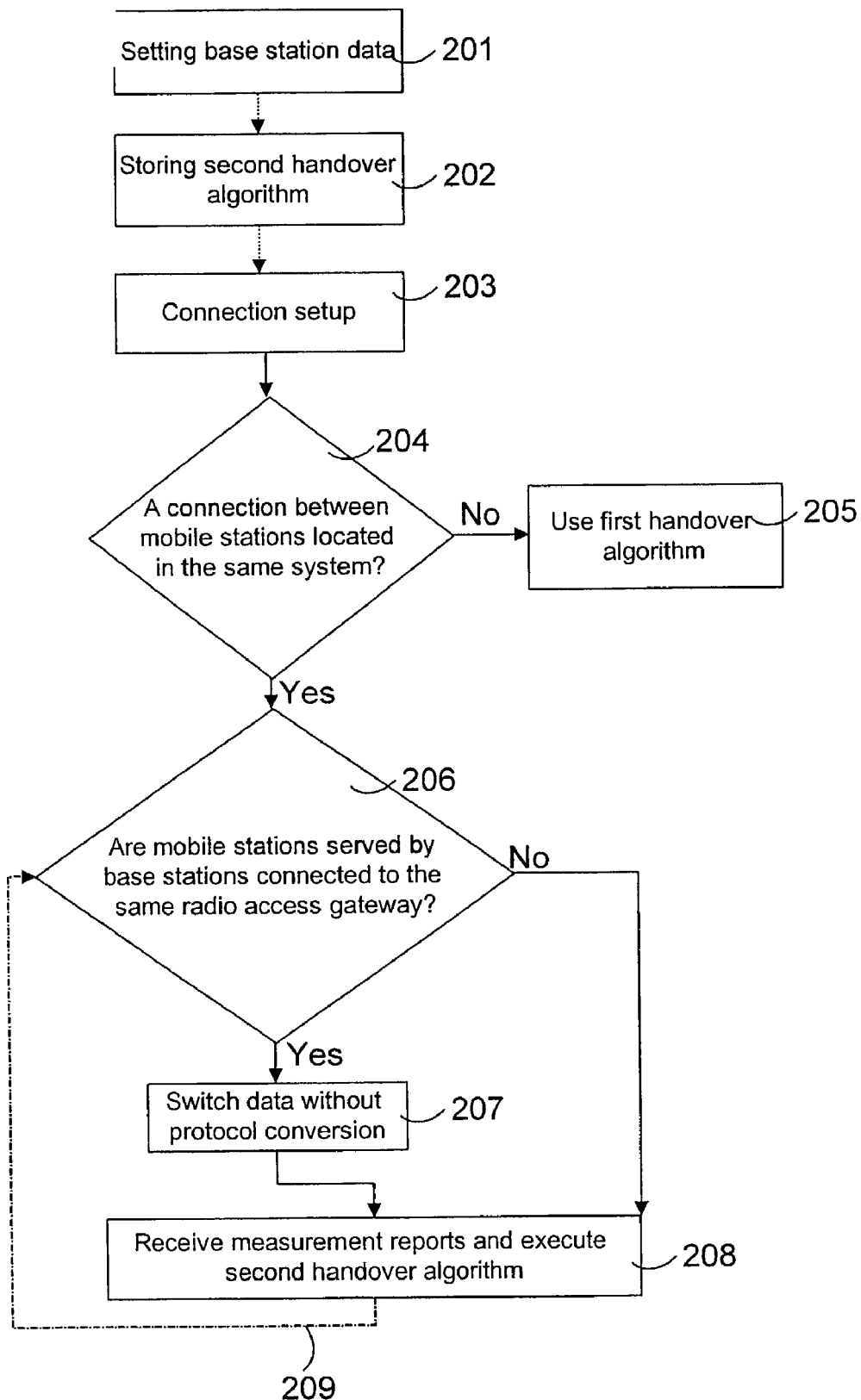
FIG. 2 is a flow diagram illustrating functions according to a preferred embodiment of the invention.

The RAGW further comprises the handover management functionality shown in FIG. 2 for making handover decisions between base stations BTS. The MS measures the frequencies of the base stations included in the base-station-specific adjacent cell list maintained by the RAGW, at the most, however, 32 frequencies. On the basis of the reports transmitted by the MS and the base station BST serving it, the base station serving the mobile station is compared with the base stations included in its adjacent cell list, by applying the second handover algorithm, if the check (204) has shown that a mobile-to-mobile connection between mobile stations of the same system (for example mobile stations served by radio access gateways located in one and the same office building) is concerned. If necessary, the RAGW initiates handover to a base station proposed by the second handover algorithm. The RAGW emulates the base station controller BSC of the GSM system, GSM handover to a selected base station in itself being well known for example from *The GSM System for Mobile Communications* by M. Mouly and M. Patet, Palaiseau, France, 1992, ISBN:2-9507190-0-7. The check (208) can also be made on the basis of an MSISDN number (Mobile Station ISDN Number) of the destination the connection given in the setup message is addressed to.

Figure 6:
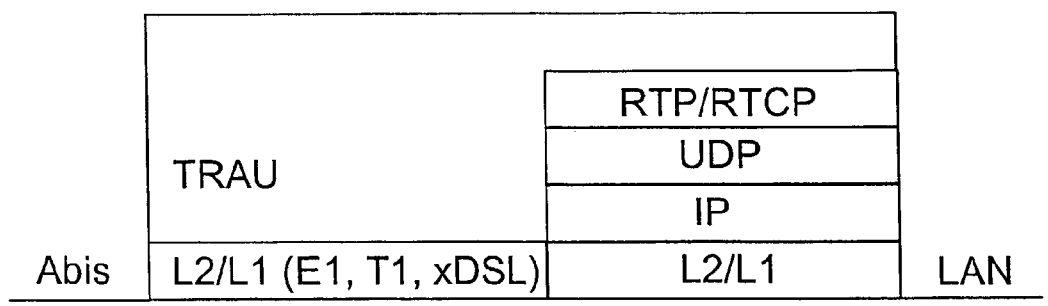
FIG. 6 illustrates a protocol stack of the radio access gateway used for transferring speech data in accordance with the GSM/H.323 standards.

FIG. 6 illustrates a protocol stack of a radio access gateway to be used in a local area network LAN for transferring speech data between an Abis interface in the GSM system and an IP-based network LAN. The radio access gateway arranges the speech information included in the H.323 packets received from the IP-based network LAN into time slots, typically of 16 kbit/s, of TRAU frames (Transcoder and Adaptor Unit), and vice versa. If the mobile stations communicating with each other are served by base stations BTS connected to the same radio access gateway RAGW, the RAGW converts the uplink TRAU frames to be transmitted to downlink TRAU frames by using E1 switching, for example, when a speech link is concerned. The speech information in the speech link remains unchanged, but the control bits of the TRAU frames are changed in the downlink. In practice the delay of data transmitted according to the invention between mobile stations connected to the same radio access gateway is smaller than in the GSM system where data travels through at least two transcoders and one mobile switching centre.

It is to be understood that the field of application of the invention is in no way restricted to the system shown in FIG. 5, but it can also be used for example in systems which are based on the UMTS standard (Universal Mobile Telecommunications System) and which comprise gateways. In the future mobile communications systems even the data traffic inside the access network may be packet-switched and especially IP-based. According to an embodiment, the gateway performs protocol conversion from IP-based packet-switched data received from base stations (may be called as Node B in UMTS) to circuit-switched data and vice versa. Such gateway can be configured to provide the functions illustrated in FIG. 2. It is apparent to a person skilled in the art that as technology advances, the basic idea of the invention can be implemented in various ways. The invention and its embodiments are thus not restricted to the examples described above, but they may vary within the scope of the claims.

The invention claimed is:

1. A method, comprising:
    checking whether a mobile station is engaged in a data transfer connection with another mobile station in a wireless telecommunications system;
    checking, in response to the mobile station being engaged in a data transfer connection with another mobile station in the wireless telecommunications system, whether base stations currently serving the mobile stations are connected to a same gateway which controls the base stations connected thereto, and which performs protocol conversion; and
    switching data exchanged by the mobile stations in the gateway without performing protocol conversion, in response to the base stations currently serving the mobile stations being connected to the same gateway.

2. A method according to claim 1, wherein the address to which data is to be transmitted from the gateway is checked; and wherein
    the data exchanged by the mobile stations in the gateway is switched without performing protocol conversion, in response to the address being the same as the address of the gateway.

3. A method according to claim 1, wherein the gateway performs protocol conversion from circuit-switched data received from the base stations to internet protocol based packet-switched data and vice versa.

4. A method according to claim 3, wherein the mobile stations and the base stations support a global system for mobile communication standard; and wherein
    the gateway comprises a carrying out unit configured to carry out a protocol conversion of user data between a base station supporting the global system for mobile communication standard and a device supporting an audio-visual communications standard.

5. A method according to claim 1, wherein the gateway performs protocol conversion from internet protocol based packet-switched data received from the base stations to circuit-switched data and vice versa.

6. A system, comprising:
    at least one mobile station;
    base stations serving mobile stations; and
    at least one gateway controlling the base stations connected to the gateway and performing a protocol conversion,
    wherein the telecommunications system is configured to check whether the mobile station is engaged in a data transfer connection with another mobile station in the wireless telecommunications system, the telecommunications system is configured to check, in response to the mobile station being engaged in a data transfer connection with another mobile station in the wireless telecommunications system, whether the base stations currently serving the mobile stations are connected to the same gateway; and wherein the gateway is configured to switch the data between the mobile stations without performing a protocol conversion, in response to the base stations currently serving the mobile stations being connected to the same gateway.

7. The system according to claim 6, wherein the gateway is configured to:
    check the address to which it transmits data; and
    switch the data between the mobile stations without performing a protocol conversion, in response to the address being the same as the address of the gateway.

8. The system according to claim 6, wherein the mobile stations and the base stations support a global system for mobile communication standard; and wherein the gateway comprises a carrying out unit configured to carry out a protocol conversion of user data between a base station supporting a global system for mobile communication standard and a device supporting an audiovisual communications standard.

9. An apparatus, comprising:

a base station controller configured to control at least one base station connected to the apparatus;

a data switch configured to carry out a protocol conversion;

a controller which is operationally connected to the switch, wherein the controller is configured to check whether the mobile station served by the base station is engaged in a data transfer connection with another mobile station in the wireless telecommunications system;

check, in response to the mobile station being engaged in a data transfer connection with another mobile station in the wireless telecommunications system, whether the base stations currently serving the mobile stations are connected to the same apparatus; and command the switch to switch the data between the mobile stations without a protocol conversion, in response to the base stations currently serving the mobile stations being connected to the apparatus, and wherein the switch is configured to switch the data between the mobile stations without a protocol conversion, in response to a command from the controller.

10. An apparatus, comprising:

base station control means for controlling at least one base station connected to the apparatus;

data switching means configured to carry out a protocol conversion;

control means which is operationally connected to the switching means, wherein the control means is for checking whether the mobile station served by the base station is engaged in a data transfer connection with another mobile station in the wireless telecommunications system;

checking, in response to the mobile station being engaged in a data transfer connection with another mobile station in the wireless telecommunications system, whether the base stations currently serving the mobile stations are connected to the same apparatus, and commanding the switching means to switching means the data between the mobile stations without a protocol conversion, in response to the base stations currently serving the mobile stations being connected to the apparatus, wherein the switching means is configured to switching means the data between the mobile stations without a protocol conversion, in response to a command from the control means.

\* \* \* \* \*